United States Patent

Wallace

[15] 3,700,020
[45] Oct. 24, 1972

[54] BOLT ANCHOR ASSEMBLY

[72] Inventor: Richard M. Wallace, 10 Lillian Drive, Binghamton, N.Y. 13903

[22] Filed: Aug. 24, 1970

[21] Appl. No.: 66,315

[52] U.S. Cl. ................................................151/41.7
[51] Int. Cl. ...............................................F16b 39/00
[58] Field of Search....151/41.7, 41.71, 41.76, 41.75; 85/8.9, 8.6, 1 H, 1 P; 24/224 BW, 224 R, 223; 248/224; 211/176

[56] References Cited

UNITED STATES PATENTS

| | | | |
|---|---|---|---|
| 3,458,233 | 7/1969 | Kell | 151/41.75 |
| 1,820,064 | 8/1931 | Green | 151/41.7 |
| 2,029,089 | 1/1936 | Weirauch | 248/224 |
| 3,425,102 | 2/1969 | Hatfield | 24/224 R |
| 2,665,730 | 1/1954 | Trumble | 151/41.7 |
| 3,406,433 | 10/1968 | Frey | 24/223 |
| 2,246,457 | 6/1941 | Schultz | 85/1 H |
| 2,704,680 | 3/1955 | Bedford | 24/223 |
| 3,346,126 | 10/1907 | Bloom et al. | 211/176 |

*Primary Examiner*—Edward C. Allen
*Attorney*—Charles S. McGuire

[57] ABSTRACT

An assembly for firmly anchoring a bolt, especially in sheet metal or other relatively thin stock. A keyhole-shaped opening is provided in the base and a special nut is inserted in the large part of the opening and moved laterally into the elongated narrower part with grooves in each side of the nut engaging the base on each side of the elongated opening. A resilient plug of rubber or plastic is inserted into the large part of the opening to prevent movement of the nut.

1 Claim, 3 Drawing Figures

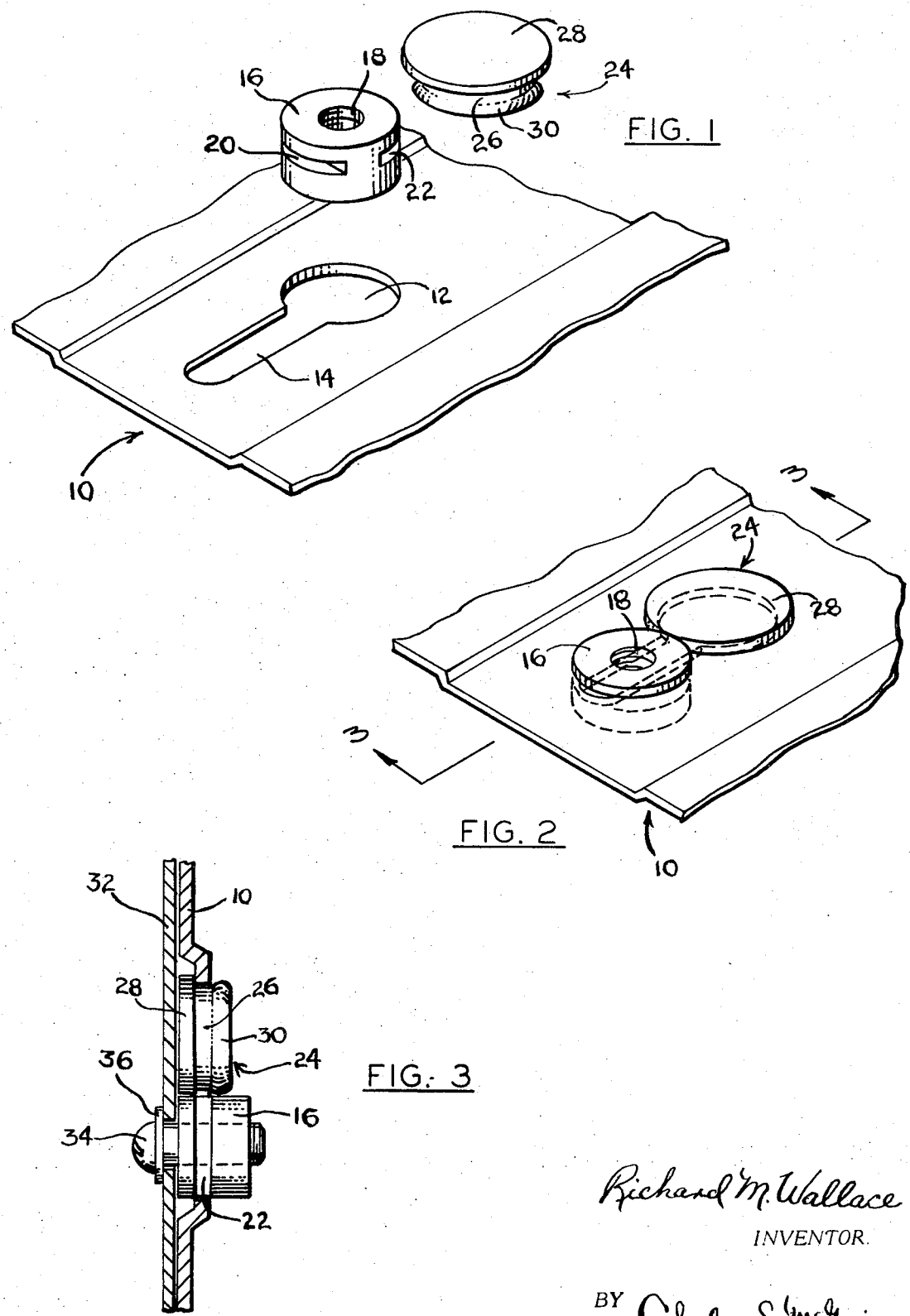

BOLT ANCHOR ASSEMBLY

The present invention relates to special fastening devices and more particularly, to means for anchoring a screw or bolt in a piece of sheet metal, or the like.

In many applications where sheet metal or similar thin stock comprises one or both of two materials to be fastened together the more expedient, conventional fastening means are often unsuitable. For example, the use of self-tapping screws sometimes results in the screw pulling through or enlarging too greatly the opening formed in the relatively thin material in which it is anchored. Likewise, conventional nut and bolt fasteners are objectionable in certain applications, such as in equipment subject to some types of vibration since both the nut and bolt are subject to rotation and therefore to loosening, as well as in locations readily accessible from only one side, thereby rendering difficult or impossible the task of inserting the bolt from one side into the nut on the other.

It is a principal object of the present invention to provide a novel and convenient means for fastening together two objects, at least one of which comprises a relatively thin sheet material, in a manner which provides a tight and secure fastening with minimal possibility of becoming loose or pulling through the base material.

Another object is to provide a nut-and-bolt type fastening device useful in holding two pieces of sheet metal, or the like, in tight engagement in a novel and improved manner.

A further object is to provide a novel assembly for firmly and securely, yet removably, anchoring a screw or bolt with respect to a piece of thin sheet stock.

Other objects of the invention will in part be obvious and will in part appear hereinafter.

The invention accordingly comprises the features of construction, combination of elements, and arrangement of parts, which will be exemplified in the article hereinafter described, and the scope of the invention will be indicated in the claims.

For a fuller understanding of the nature and objects of the invention reference should be had to the following detailed description taken in connection with the accompanying drawings, in which:

FIG. 1 is a perspective view of the special nut and retainer portions of the assembly shown with a fragment of one of the two sheet materials to be fastened together;

FIG. 2 is a similar perspective view showing the nut and retainer in their assembled positions; and FIG. 3 is a side sectional view showing two sheets fastened together with all elements fully assembled.

The invention will be described in a typical application wherein it is utilized to provide a removable fastening means for two relatively thin materials, such as sheet metal or the like. It will be understood, however, that it is equally useful in other applications. That is, while the nut portion of the assembly is retained in a special opening provided in a base material of sheet metal, or the like, any other item, such as a wire, washer, insulator, etc., may be retained between the head of the bolt and the nut.

In FIG. 1 is shown a fragment of thin sheet stock 10 which has been previously prepared to receive other elements of the assembly by having cut therein a keyhole-shaped opening having a circular portion 12 and an elongated slot 14, narrower than the diameter of the circular opening. In the illustrated embodiment, the opening is cut in a portion of material 10 wherein the plane of the surface is parallel to, but displaced slightly from, the plane of the surface on each side of such portion. That is, the opening is formed in a slight depression in the material for reasons which will later become apparent. The opening may be cut punched, or otherwise formed in material 10 by a conventional or special-purpose cutting tool or die, or in any other convenient manner. Likewise, the depression may be formed in any known manner either at the time the article of which material 10 is a part is initially fabricated, or at a later time when it is desired to utilize the assembly of the present invention.

Nut 16 has a generally cylindrical shape, having a diameter slightly less than that of circular opening 12, with the usual internally threaded opening 18. Grooves 20 and 22 are cut in the sides of nut 16 directly opposite one another. The grooves have upper and lower surfaces which are essentially parallel with the upper and lower surfaces of the cylindrical body. Each groove has a width or thickness between the facing upper and lower surfaces thereof at least as great as the thickest material 10 with which the nut 16 is intended to be used. The grooves are cut to a depth such that the distance between the essentially straight, parallel terminating inner surfaces thereof is slightly less than the width of elongated slot 14. Thus, nut 16 may be positioned within the larger circular opening 12, with grooves 20 and 22 aligned with the marginal edges of elongated slot 14, and moved laterally into the slot, to the position shown in FIG. 2.

Also included in the assembly is a plug or retainer, designated generally with the reference numeral 24, and having a central portion 26 of slightly constricted diameter from that of upper and lower portions 28 and 30, respectively. Retainer 24 is made of a resilient material, such as rubber or a suitable plastic, with both upper and lower portions 28 and 30 having diameters larger than that of circular opening 12. Central portion 26 has a diameter about equal to that of opening 12, either slightly smaller or slightly larger being acceptable since the material is resilient. Once nut 16 is positioned in slot 14, as previously described, retainer 24 may be inserted in circular opening 12 by forcing lower portion 30 through the opening. The retainer will than insure that the nut cannot move laterally back toward circular opening 12.

Nut 16 is now fixed with respect to the base material of sheet 10 and is ready to receive an appropriately threaded bolt. In FIG. 3 a fragment of a second sheet material 32 is shown in covering relation to base sheet 10. Bolt 34 extends through an opening in sheet 32 and is threaded into nut 16, washer 36 being provided in conventional fashion. It is to be noted that while sheet material 32 is fixedly retained between the head of bolt 34 (or, in the illustrated form, washer 36) and nut 16, base sheet 10 is held only by the engagement of grooves 20 and 22 with the material on each side of slot 14. Therefore, no axial forces are transmitted to the base material due to the engagement of the nut and bolt, regardless of the degree of tightness of the threaded engagement thereof. Any tendency of the nut to pull through or to warp the base material is thereby minimized. Furthermore, retention of nut 16 in base sheet 10 in the manner described prevents both rotation and lateral movement of the nut, thereby reducing the tendency of the threaded engagement of nut and bolt to loosen. The previously mentioned depression in base sheet 10 wherein the opening is cut provides a space between sheets 10 and 32 approximately equal to the thickness of upper portion 28 of retainer 30 and the portion of nut 16 on the same side of sheet 10, thereby providing for a flush fit of sheets 10 and 32 in all areas except that of the depression in sheet 10.

The assembly of the present invention is particularly useful in applications where the base material is not readily accessible from the side opposite that from which the bolt is inserted. The use of conventional bolts and nuts is difficult or impossible in such situations due to the necessity of holding the nut behind the base material while inserting or removing the bolt. As is apparent from the foregoing description the nut cannot rotate in the assembly of the present invention once it has been advanced into the elongated slot so there is no need to hold it while the bolt is inserted. Likewise, the nut may be removed by inserting a bolt for a few turns and lifting the nut out of the opening, again without the necessity of holding the nut or having access to the back of the base material.

As an example of contemplated variations in the illustrated embodiment of the assembly, circular portion 12 of the keyhole-shaped opening may be oblong, or elliptical, preferably with a long axis transverse to the direction of elongation of slot 14. Nut 16 could be of like shape and thus have a greater area of engagement along the sides of slot 14. Retainer 24 would, of course, be shaped to conform generally to the enlarged part of the keyhole opening in any event. That is, configurations other than circular for portion 12 of the opening are within the scope of the invention and are intended to be encompassed by the descriptive term "keyhole-shaped opening" in the specification and claims.

What is claimed is:

1. A bolt anchor assembly comprising, in combination:

a. a relatively thin sheet of base material having formed in a first portion thereof a keyhole-shaped opening with a generally circular enlarged portion and an elongated slot extending therefrom, said first portion lying in a plane generally parallel to and displaced a first distance from the surrounding portion of said material;

b. a cylindrical nut having an internally threaded opening therethrough and a pair of grooves extending inwardly from opposing sides generally in a plane perpendicular to the axis of said threaded opening;

c. the diameter of said nut being not greater than the diameter of said enlarged portion of said keyhole-shaped opening, whereby said nut may be freely inserted into said enlarged portion;

d. the inner extremities of said opposing grooves being substantially straight and parallel to one another and perpendicular to the axis of said threaded opening, the distance between said inner extremities being not greater than the width of said elongated portion of said keyhole-shaped opening, and the width of said grooves being at least as great as the thickness of said base material, whereby said nut may be moved from said enlarged portion into said elongated slot of said keyhole-shaped opening with the material on each side of said elongated opening extending into said grooves;

e. the distance from the upper surface of said nut to said grooves being not greater than said first distance;

f. a substantially flat plug of rubbery, resilient material having generally circular upper and lower portions, both of greater diameter than said enlarged portion, joined by a central portion of substantially the same diameter as said enlarged portion, the thickness of said upper portion being substantially equal to said first distance, and g. the relative dimensions of said plug and said enlarged portion and the resiliency of said plug being such that said plug is manually insertable and removable with respect to said enlarged portion with a self-retaining fit and said upper and lower portions on opposite sides of said base material, thereby blocking movement of said nut from said elongated slot back into said enlarged portion of said keyhole-shaped opening.

* * * * *